(12) United States Patent
Wood

(10) Patent No.: US 7,618,211 B2
(45) Date of Patent: Nov. 17, 2009

(54) MANUAL BREECH LOCK WIRELINE CONNECTOR

(75) Inventor: John Robert Loxley Wood, Rennesøy (NO)

(73) Assignee: I-TEC AS, Stavanger (NO)

( * ) Notice: Subject to any disclaimer, the term of this patent is extended or adjusted under 35 U.S.C. 154(b) by 0 days.

(21) Appl. No.: 11/988,163

(22) PCT Filed: Jul. 12, 2006

(86) PCT No.: PCT/NO2006/000275

§ 371 (c)(1),
(2), (4) Date: Apr. 17, 2008

(87) PCT Pub. No.: WO2007/008087

PCT Pub. Date: Jan. 18, 2007

(65) Prior Publication Data

US 2009/0060646 A1    Mar. 5, 2009

(30) Foreign Application Priority Data

Jul. 14, 2005  (NO) .................................. 20053413

(51) Int. Cl.
*B25G 3/18*  (2006.01)
*F16B 21/00* (2006.01)
(52) U.S. Cl. ..................... 403/327; 403/348; 403/325
(58) Field of Classification Search ............. 403/109.3, 403/325, 327, 328, 348, 349, 353
See application file for complete search history.

(56) References Cited

U.S. PATENT DOCUMENTS 2,066,956 A * 1/1937 Williams .................... 403/343

(Continued)

FOREIGN PATENT DOCUMENTS

EP    0 437 084    7/1991

(Continued)

OTHER PUBLICATIONS

International Search Report mailed Oct. 17, 2006 for International Application No. PCT/NO2006/00275.

*Primary Examiner*—Daniel P Stodola
*Assistant Examiner*—Joshua T Kennedy
(74) *Attorney, Agent, or Firm*—Wenderoth, Lind & Ponack, L.L.P.

(57) ABSTRACT

A manual locking assembly for a quick connect coupling includes a cylindrical male pin, a cylindrical sleeve-shaped female part, a rotatable key bolt, a locking bolt retainer, and a spring. The rotatable key bolt is axially arranged and central within the cylindrical sleeve-shaped female part, and has a quadrilateral locking block, a cylindrical guiding flange, and a cylindrical locking bolt having millings on opposite sides. The locking bolt retainer has a cylindrical body including a transversal hole having a radius that corresponds with an outer radius of the cylindrical locking bolt and a groove extending from the transversal hole that corresponds to the millings on the cylindrical locking bolt, a lower flange on a first side of the cylindrical body, and an upper flange located on a second side of the cylindrical body opposite to the first side, the upper flange having an inclined surface on an upper side of the upper flange. The inclined surface of the upper flange is accessible through a hole in the cylindrical sleeve-shaped female part to unlock the manual locking assembly.

3 Claims, 4 Drawing Sheets

U.S. PATENT DOCUMENTS

| | | | | |
|---|---|---|---|---|
| 2,221,371 A | * | 11/1940 | De Bethune | 403/328 |
| 4,504,167 A | * | 3/1985 | Nakanishi | 403/325 |
| 4,655,631 A | | 4/1987 | Mitchell | |
| 4,692,049 A | * | 9/1987 | Engle | 403/1 |
| 4,760,984 A | * | 8/1988 | Hennessey | 248/121 |
| 4,784,543 A | | 11/1988 | Mitchell et al. | |
| 4,986,690 A | * | 1/1991 | Cooksey | 403/319 |
| 5,052,849 A | * | 10/1991 | Zwart | 403/300 |
| 5,088,853 A | * | 2/1992 | Reid | 403/330 |
| 5,390,571 A | * | 2/1995 | Fox et al. | 81/177.85 |
| 5,413,508 A | * | 5/1995 | Obara | 439/729 |
| 5,607,250 A | | 3/1997 | Tatterson et al. | |
| 5,681,257 A | * | 10/1997 | Letourneur | 494/12 |
| 6,139,214 A | * | 10/2000 | Zirps et al. | 403/325 |
| 6,170,570 B1 | * | 1/2001 | Aguesse et al. | 166/65.1 |
| 6,231,089 B1 | * | 5/2001 | DeCler et al. | 285/308 |
| 6,585,444 B1 | * | 7/2003 | Podbutzky | 403/322.1 |
| 6,719,479 B1 | * | 4/2004 | Marsh et al. | 403/327 |
| 7,066,678 B2 | * | 6/2006 | Huang | 403/321 |

FOREIGN PATENT DOCUMENTS

| | | |
|---|---|---|
| EP | 1 229 211 | 8/2002 |
| FR | 928 506 | 12/1947 |

* cited by examiner

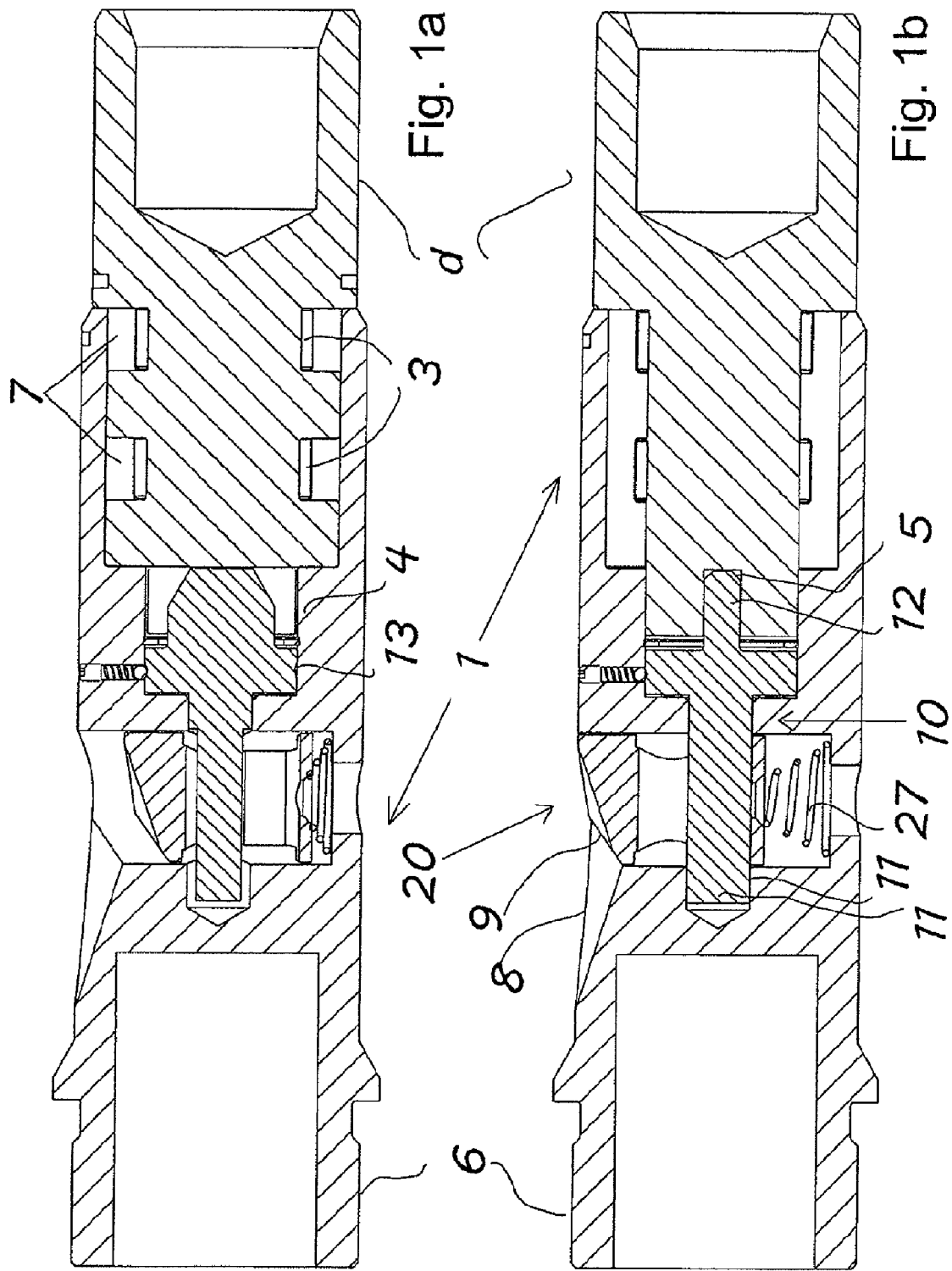

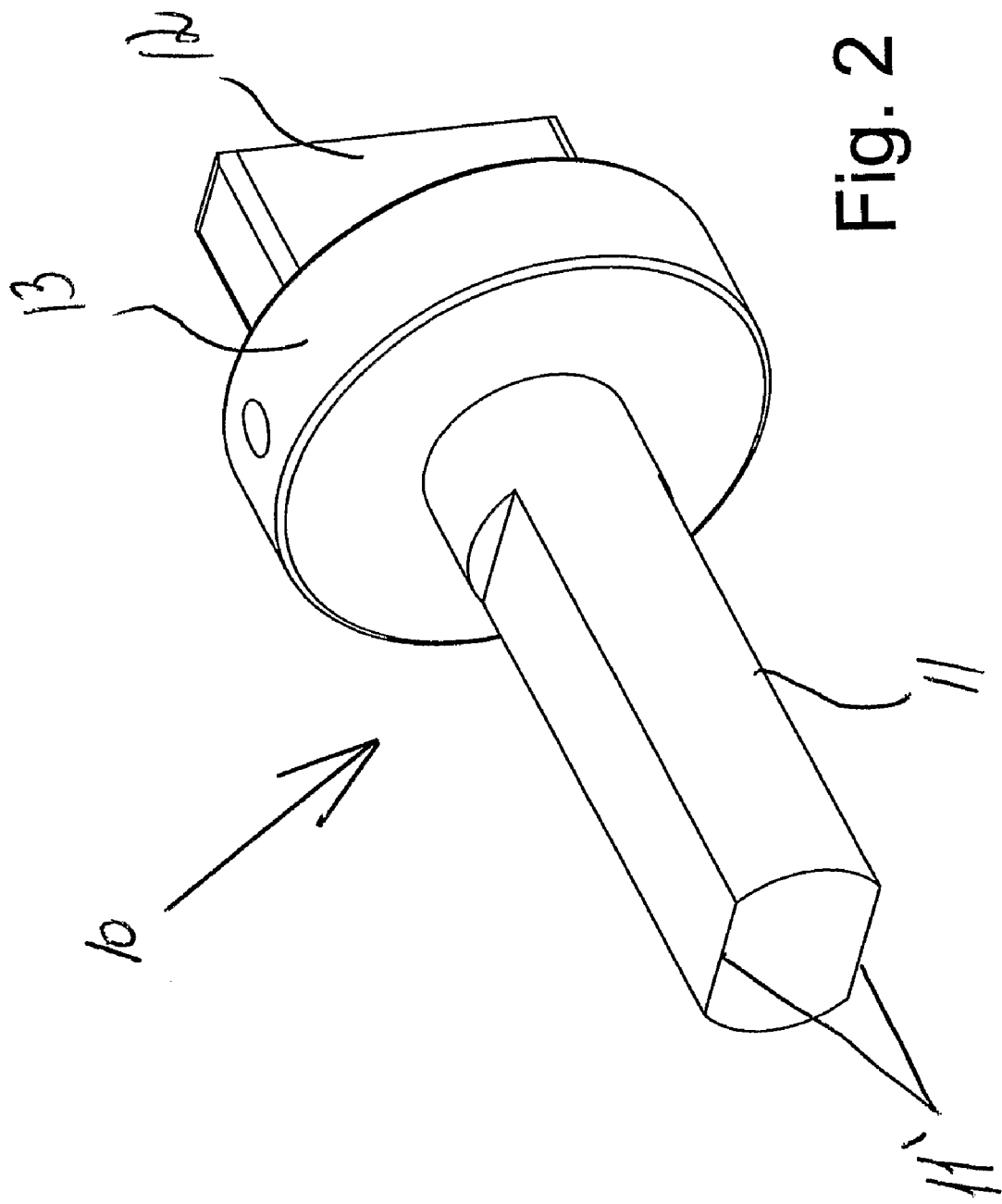

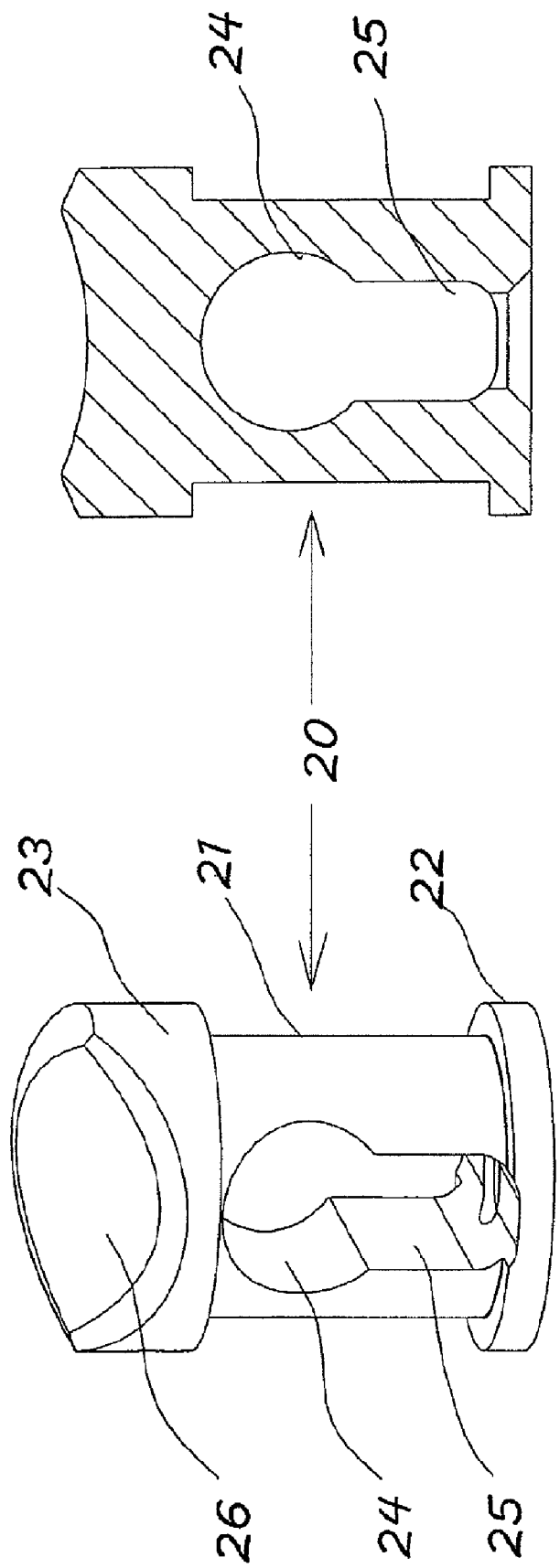

MANUAL BREECH LOCK WIRELINE CONNECTOR

BACKGROUND OF THE INVENTION

1. Field of the Invention

The present invention relates to a manual locking assembly for a quick connect coupling.

Quick connect couplings of this kind are used, inter alia, for connecting a wireline to a tool string.

2. Description of the Related Art

The following patents describe prior art:

FR 928 506;

U.S. Pat. No. 5,052,849; and

U.S. Pat. No. 5,607,250.

These patents disclose quick connect couplings based on a male part having radial sidewalls that are brought into corresponding engagement in radial grooves of a female part and locked therein by various locking plates in order to resist high torsional forces in addition to tensile forces. The coupling of the male and female parts also occurs laterally, with the interlocking being accomplished by means of a cylindrical spring loaded latching element, suspended in the female part, that is guided axially down in the top of the male part and locked. Normally, unlocking is accomplished using a special tool and a pipe wrench.

EP 1229211 discloses a manual quick connect coupling for a wireline tool comprising a male part having a number of retaining lugs and a transversal groove provided at the front end of the male part. The arrangement also comprises a female part, a connector part, a spring, and a sleeve-shaped part to be mounted in the female part.

U.S. Pat. No. 4,986,690 relates to a quick connect coupling wherein it is known that a male pin is guided into a locking sleeve and brought into contact with a locking assembly. The male pin is then rotated to bring guiding and retaining lugs into abutment in corresponding locking grooves. Simultaneously, the locking assembly is brought into engagement with a groove cut at the tip of the male pin, whereby a spring is unloaded. The publication further shows how uncoupling is accomplished by compressing the spring and bringing the male pin to the release position by rotation. This is accomplished using special tools and a pipe wrench.

U.S. Pat. No. 4,655,631 and U.S. Pat. No. 4,784,543 describe lockable quick connect couplings wherein the coupling is achieved by guiding the male pin into a locking sleeve. It is further shown that a number of guiding and retaining lugs extend from the outer radius of the male pin and that the male pin is retained by rotation, so that the retaining lugs are brought into abutment in locking grooves in the locking sleeve.

SUMMARY OF THE INVENTION

According to the present invention, a locking assembly is provided that allows both the locking and the unlocking of the quick connect coupling to be performed using hand power.

According to the present invention, this is accomplished by means of a quick connect coupling.

BRIEF DESCRIPTION OF THE DRAWINGS

In the following, a detailed description of an embodiment of the present invention is given, with reference to the attached drawings, wherein:

FIGS. 1a-b show side views of the quick connect coupling according to an embodiment of the present invention;

FIG. 2 shows a perspective view of a detail of the quick connect coupling according to an embodiment of the present invention;

FIGS. 3a-b show a perspective view and a cross-section, respectively, of another detail of the quick connect coupling according to an embodiment of the present invention.

DETAILED DESCRIPTION OF THE INVENTION

Figure 4B:
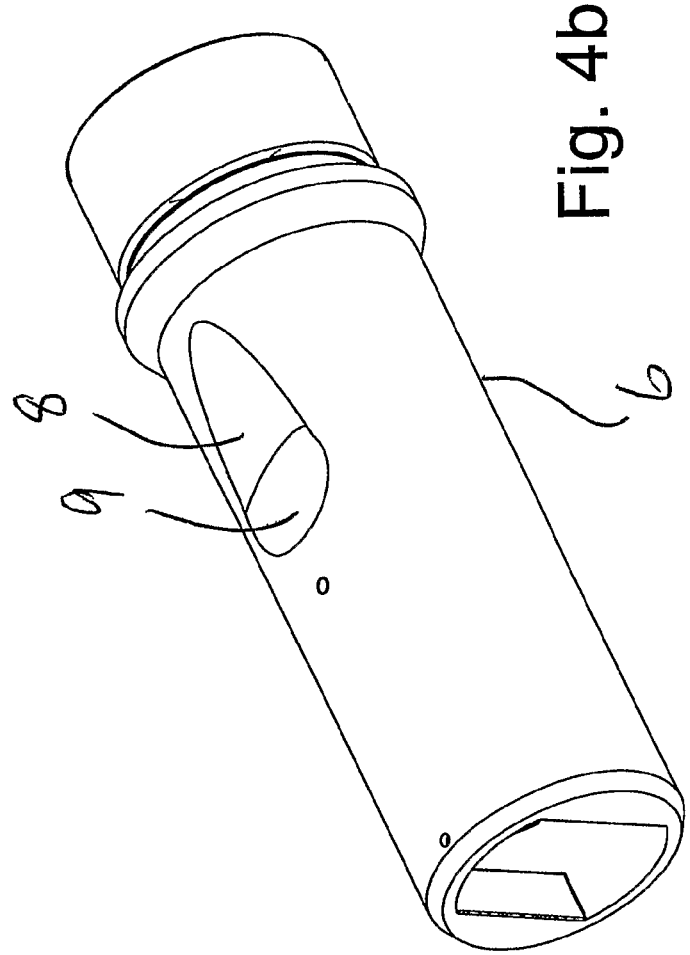
FIGS. 4a-b show in a perspective view the manner in which two parts of the quick connect coupling according to an embodiment of the present invention fit together.
Figure 4A:
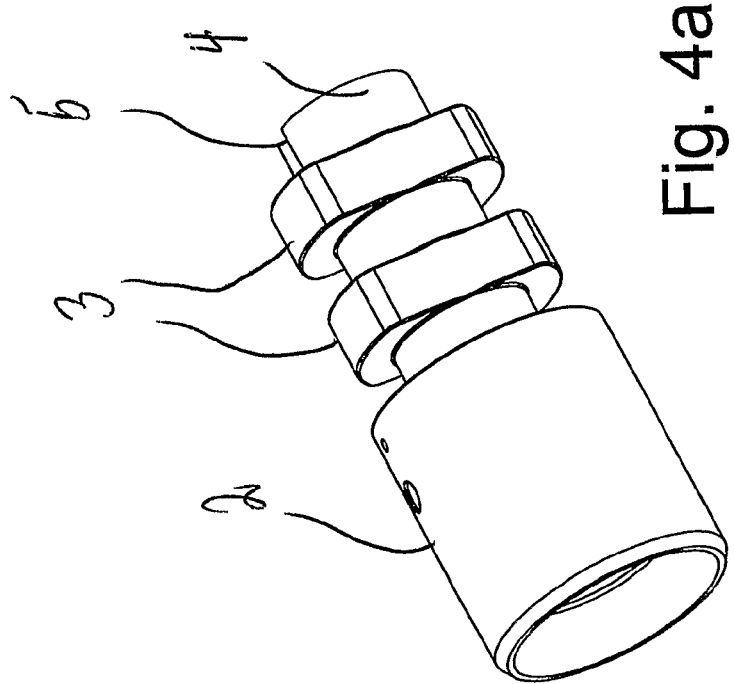

FIGS. 4a-4b show a locking assembly in the form of a key bolt 10 incorporated into a quick connect coupling 1 as well as detail drawings of the three main components of the key bolt 10, a locking bolt 11, a locking block 12, and a locking bolt retainer 20.

FIG. 1a shows a side view of the male pin 2 of the quick connect coupling 1 guided into a female part 6 before being rotated 90°, wherein the guiding and retaining lugs 3 are not brought into abutment in locking grooves 7. Locking block 12 is seated in a groove 5 in the front piece 4 of the male pin 2 before being rotated.

FIG. 1b shows a similar side view of the quick connect coupling 1 after rotation of the male pin within the female part 6, with the guiding and retaining lugs 3 now being seated in locking grooves 7. Locking bolt 11 and locking block 12 of the locking assembly 10 are rotated 90°, so that the locking bolt 11 with millings 11' on the upper and lower diameter is allowed to slide in grooves 25 in a locking bolt retainer 20, which during rotation is pushed down using the thumb and tensions an underlying spring 27.

FIG. 2 shows a 3D detail drawing of the key bolt 10 of the locking assembly that is operated axially between the male pin 2 and the female part 6, and that consists of a locking bolt 11 with millings 11' on opposing sections for operation through a locking bolt retainer 20, a guiding flange 13, and a quadrilateral locking block 12, the locking block 12 corresponding with the groove 5 in the cylindrical front piece 4 of the male pin 2.

FIG. 3a shows a 3D detail drawing of the locking bolt retainer 20 having a cylindrical body 21 comprising a lower flange 22 and an upper flange 23, wherein a transversal hole 24 is drilled centrally through the body 21, the transversal hole 24 corresponding with the outer radius of the locking bolt 11, and wherein a groove 25 corresponding with the millings 11' on the locking bolt 11 extends from the hole 24. The upper flange 23 has an inclined surface 26 designed for application of thumb pressure through a hole 9 with associated guiding grooves 8 in the female part for use on locking and unlocking.

FIG. 3b is a side view of the locking bolt retainer 20 showing the hole 24 and the groove 25.

FIG. 4a shows in a 3D drawing the male pin 2 comprising guiding and retaining lugs 3 and a front piece 4 with grooves 5 for the locking block 12.

FIG. 4b shows a similar drawing of the female part 6 comprising a guiding groove 8 and a hole 9 for the locking bolt retainer.

The invention claimed is:

1. A manual locking assembly for a quick connect coupling, the manual locking assembly comprising:
   a cylindrical male pin having at least one guiding and retaining lug extending from an outer radius of the cylindrical male pin and a cylindrical front piece having a groove;
   a cylindrical sleeve-shaped female part having a hole with an associated guide groove, and locking grooves, the locking grooves being formed within the cylindrical sleeve-shaped female part;
   a rotatable key bolt axially arranged and central within the cylindrical sleeve-shaped female part, the rotatable key bolt comprising a quadrilateral locking block, a cylindrical guiding flange, and a cylindrical locking bolt having millings on opposing sides of the cylindrical locking bolt;
   a locking bolt retainer comprising:
      a cylindrical body including a transversal hole having a radius that corresponds to an outer radius of the cylindrical locking bolt and a groove extending from the transversal hole that corresponds to the millings on the cylindrical locking bolt;
      a lower flange on a first side of the cylindrical body; and
      an upper flange located on a second side of the cylindrical body opposite the first side, the upper flange having an inclined surface on an upper side of the upper flange; and
   a spring located below the locking bolt retainer, the spring being preloaded to lock, wherein
      the inclined surface of the upper flange is accessible through the hole in the cylindrical sleeve-shaped female part to unlock the manual locking assembly,
      the guiding and retaining lug is brought into abutment with the locking grooves during rotation, and
      the quadrilateral locking block extends into the groove in the cylindrical front piece during engagement.

2. The manual locking assembly according to claim 1, wherein
   when the cylindrical male pin is guided into abutment in the cylindrical sleeve-shaped female part, the quadrilateral locking block is adapted to rest in the groove in the cylindrical front piece of the cylindrical male pin, and
   when the cylindrical male pin is rotated relative to the cylindrical sleeve-shaped female part, the rotatable key bolt is adapted to rotate correspondingly, so that the millings of the cylindrical locking bolt are rotated and slide in the groove extending from the transversal hole, the locking bolt retainer being forced upwards by the spring.

3. The manual locking assembly according to claim 1, wherein
   the locking bolt retainer is positioned to be pushed down on unlocking, while the cylindrical male pin is rotated relative to the cylindrical sleeve-shaped female part, so that the cylindrical locking bolt is rotated in the transversal hole, and the guiding and retaining lug is rotated out of the locking grooves, thereby releasing the cylindrical male pin from the cylindrical sleeve-shaped female part.

* * * * *